Patented Jan. 17, 1939

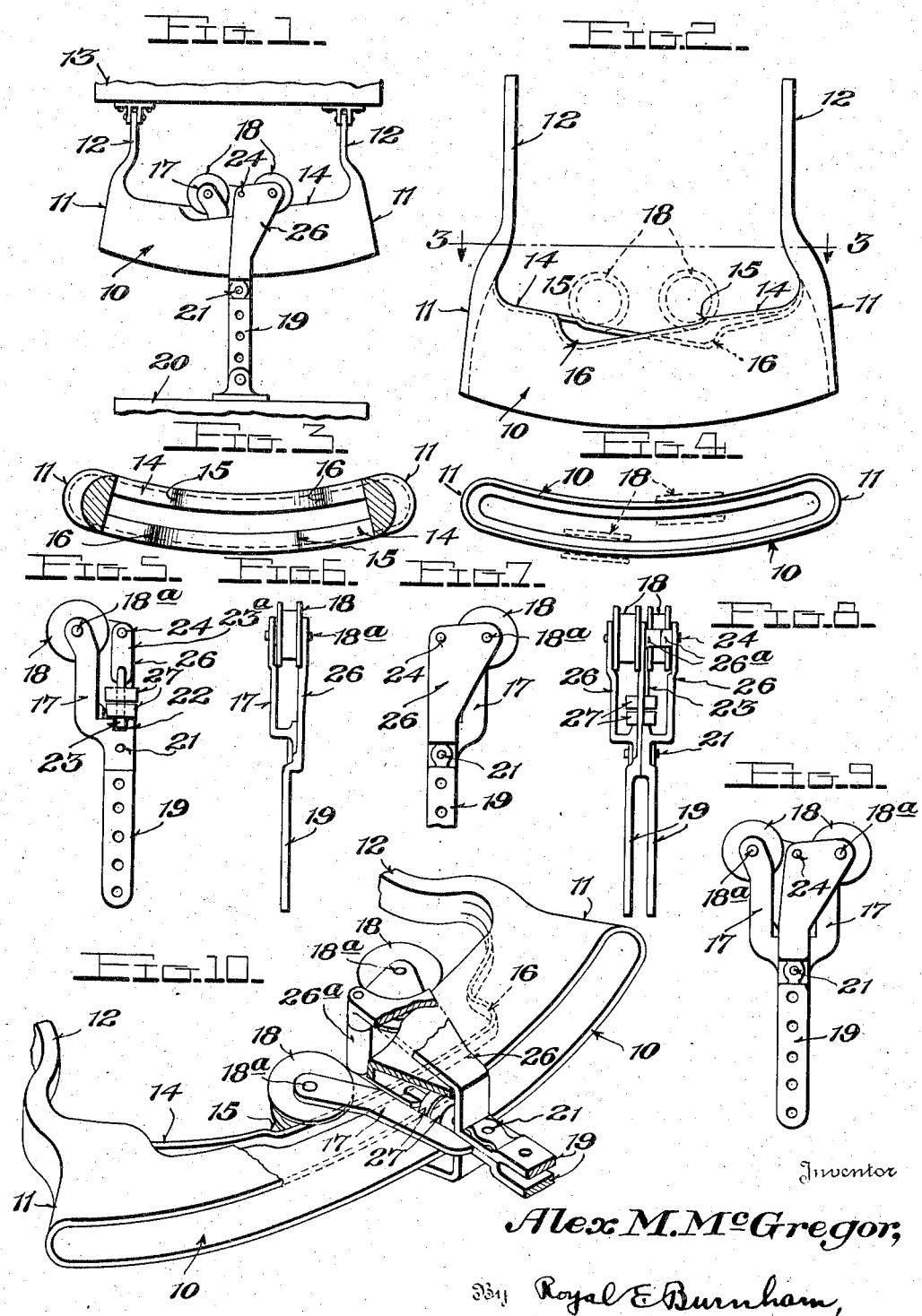

2,144,295

UNITED STATES PATENT OFFICE 2,144,295

COUPLING LAND AND ROAD VEHICLES AND THE LIKE

Alex Munro McGregor, Randwick, New South Wales, Australia

Application December 10, 1936, Serial No. 115,209
In Australia August 29, 1936

12 Claims. (Cl. 280—33.10)

This invention relates to improvements in flexibly coupling a road or land vehicle or implement, in off-set or central position as desired, to the rear of a hauling or pulling road or land vehicle so that the pull of the leading vehicle on the rear vehicle or the like is automatically adjusted during change of direction of travel with the result that outward swing of the rear vehicle is prevented during the turning movement of the leading vehicle and the rear vehicle tends to travel on or close to the curved track made by the leading vehicle.

The leading vehicle, whether power or animal driven, is hereinafter called the tractor, and the rear vehicle, which may be a harvester, harrows, plow or cultivator, or any machine or device that is required to travel behind the tractor, is hereinafter called the trailer.

In my invention I provide a two part coupling or drawbar which has its parts so constructed and positioned on each other that it lies transversely to the longitudinal axes of the tractor and trailer, each part is automatically slidable transversely on and across the other part, and the parts return to central position relatively to each other without interference from the driver of the tractor.

In the accompanying drawing which illustrates one form of the invention:—

Fig. 1 is a plan view of the coupling as connected with a tractor and a trailer;

Fig. 2 is a plan view of the front member of the coupling;

Fig. 3 is a front view of the front member, the arms being in section on the line 3—3, Fig. 2;

Fig. 4 is a rear view of the front member;

Fig. 5 is a bottom view of one of the parts of the rear member;

Fig. 6 is a side view of that part;

Fig. 7 is a top view thereof;

Fig. 8 is a side view of the rear member;

Fig. 9 is a top view thereof;

Fig. 10 is an isometric view.

The front member of the coupling includes upper and lower plates 10 of arcuate shape in plan uniformly spaced from each other and secured together at their ends at 11 to forwardly extending arms 12, these arms being for connection with a tractor 13 or other draft means. Preferably the front member is a metal framing cast in one piece.

Each plate 10 is provided on its front edge with a sloping runway 14 having a step 15 near and above the central median line and a curved depression or stop 16 near its lower end. The respective runways are disposed in reversely sloping direction to each other, and the plates are curved so that the lateral portions are at a higher level than the central or median portion.

The rear member of the coupling is formed of two similar longitudinal parts secured together by a bolt 21, and having a stem portion 19 that extends rearwardly from the bolt and is holed to facilitate its connection with a trailer 20 or other thing to which draft is to be applied.

Each of these parts has an arm 17 that is offset from the axis of the part (see Fig. 6) and is deflected laterally from the axis (see Fig. 5), and a plate 26 that is substantially parallel with the arm. A flanged roller 18 between the arm and plate is journaled thereon at 18a. Each of these parts is formed with a half-seat 22. When the two parts are bolted together, a full seat is provided, in which seat the end of an axle 23 is disposed. Rollers 27 are journaled on the axle. The forward portion of the axle 23 is flattened as a plate 23a, which is connected in the structure by a pin 24. This pin is carried by the two plates 26, and it carries a sleeve 26a to keep the two plates properly spaced.

When the front and rear members of the coupling are assembled, one of the plates 26 of the rear member is above the upper plate 10 of the front member and the other plate 26 is below the lower plate 10, the two arms 17 are between the two plates 10, the rollers 27 are capable of traverse between the latter plates, and the rollers 18 are in position to traverse the runways 14.

The rollers 27 take the weight of the front end of the trailer and prevent up and down movement of the front end of the carrier, thus tending to keep the rollers 18 on the runways 14.

The construction of the carrier is such that each part is detachable for inspection and renewal, the moving parts being protected from dust, rain and mud by a suitably shaped casing.

In operation, the coupling having been attached to a tractor and to a trailer, forward straight-line travel of the tractor and trailer induces the carrier to take up a central position on the framing, the centralizing movement being assisted by the downward slope of the runways 14 towards the central line.

When the tractor changes its direction of travel the forward pull on the trailer is gradually decreased as the angle between the longitudinal axis of the tractor and that of the trailer increases. At the same time the framing, which is detachably secured to the tractor and moves forwardly and curvilinearly therewith, slides laterally under the rollers 18 in the reverse direction to that of the front end of the tractor. As the change of direction increases the trailer slows down and may cease to move until the framing reaches the end of its transverse travel under the rollers.

The angle of the longitudinal axis of the tractor to that of the trailer is now at its maximum and the forward pull on the trailer is at its minimum, the result being that the trailer tends to be drawn towards the inside of the curved track of the tractor and does not follow the transverse movements of the framing.

When the tractor again travels in straight-line direction the rollers 18 on the carrier run down the sloping runways until they reach the central neutral position; the trailer then follows the line taken by the tractor. Turning movements of the tractor effect transverse sliding movements of the framing along the carrier, and forward pull on the trailer effects sliding movements of the carrier along the framing, except in cases where the longitudinal axes of the tractor and trailer are parallel to each other.

I claim:—

1. A tractor and trailer coupling consisting of a metal framing adapted to be detachably secured to the rear of a tractor, transverse reversely sloping runways on the framing, rollers on the runways, and a carrier for said rollers adapted to be detachably secured to the front of a trailer, said framing and said carrier being transversely slidable on each other.

2. A tractor and trailer coupling adapted to be detachably secured to the rear of a tractor transversely to the longitudinal axis of the tractor, reversely sloping and upwardly curved runways on the framing, rollers on the runways, and a metal carrier for the rollers adapted to be detachably secured to the front of a trailer and to move transversely relatively to said framing.

3. A tractor and trailer coupling consisting of a metal framing adapted to be detachably secured to the rear of a tractor, transverse reversely sloping and upwardly curved spaced runways on said framing, an independent roller on each runway, and a metal carrier for said rollers adapted to be detachably secured to the front of a trailer and to move transversely relatively to said framing.

4. A tractor and trailer coupling consisting of a metal framing adapted to be detachably secured to the rear of a tractor, spaced upwardly curved and reversely sloping transverse runways on the front edge of said framing, an independent roller on each runway, and a metal carrier for said rollers adapted to be detachably secured to a trailer and to slide transversely relatively to said framing.

5. A tractor and trailer coupling consisting of a metal framing adapted to be detachably secured to the rear of a tractor and having upper and lower transverse plates spaced from each other, a transverse upwardly curved sloping runway on the front edge of one of said plates, a transverse upwardly curved reversely sloping runway on the front edge of the other of said plates, an independent roller on each of said runways, and a carrier for said rollers adapted to be detachably secured to the front of a trailer and to slide transversely relatively to said framing.

6. A tractor and trailer coupling consisting of a metal framing formed of two upwardly curved spaced plates and adapted to be detachably secured to the rear of a tractor, a transverse upwardly curved sloping runway on the front edge of one of said plates, a transverse upwardly curved and reversely sloping runway on the front edge of the other of said plates, an independent roller on each runway, a carrier for said rollers adapted to be detachably secured to the front of a trailer and to slide transversely on said framing, and a roller on said carrier adapted to contact with the inner faces of said plates.

7. A tractor and trailer coupling consisting of a metal framing adapted to be detachably secured to the rear of a tractor transversely to the longitudinal axis of the said tractor, an upwardly curved and sloping transverse runway on the framing, an independent upwardly curved and reversely sloping transverse runway on the framing, an independent roller on each runway, a carrier for said rollers adapted to be detachably secured to the front of a trailer and to slide transversely along said framing, and a third roller rotatably mounted on said carrier and adapted to contact with the interior of said framing.

8. A tractor and trailer coupling consisting of a curved metal framing adapted to be detachably secured to the rear of a tractor transversely in relation thereto, a transverse curved and sloping runway on said framing, an independent spaced and transverse curved and reversely sloping runway on said framing, an independent roller on each runway, a carrier for said rollers adapted to be detachably secured to a trailer, and a third roller mounted on said carrier and adapted to contact with and run over the interior curved faces of the said framing.

9. A tractor and trailer coupling consisting of a metal framing adapted to be detachably secured to the rear of a tractor transversely thereto, two independent and uniformly spaced curved and reversely sloping runways on the said framing, an independent roller on each runway, a carrier for said rollers adapted to be detachably secured to a trailer and to slide transversely along said framing, and a conical roller mounted within said carrier and adapted to contact with the interior of said framing.

10. A tractor and trailer coupling consisting of a metal framing having forwardly extending arms adapted to be detachably secured to the rear of a tractor transversely thereto and having spaced upper and lower transverse plates with their lateral ends at a higher level than the central portions of the plates, a curved sloping runway on the front edge of one of said plates, a curved reversely sloping runway on the front edge of the other of said plates, a curved depression in the lower end of each runway, a roller on each runway, a carrier for said rollers adapted to be detachably secured to the front of a trailer, and a third roller mounted on and within the carrier and adapted to contact with and run over the inner faces of said plates.

11. A tractor and trailer coupling consisting of a metal framing having forwardly extending arms adapted to be detachably secured to a tractor transversely thereto and having spaced upper and lower transverse plates with their lateral ends at a higher level than the central portions of the plates, a curved sloping runway on the front edge of one of said plates, a curved reversely sloping runway on the front edge of the other of said plates, a step in each runway, a curved depression in the lower end of each runway, an independent roller on each runway, a carrier for said rollers adapted to be detachably secured to the front of a trailer, and rollers mounted on and within the carrier and adapted to contact with and run over the inner faces of said plates.

12. A haulage device comprising a member adapted to be secured to a tractor and having transverse reversely sloping runways, rollers traversable of said runways, and a coupling carrying said rollers adapted to be attached to a trailer.

ALEX MUNRO McGREGOR.